United States Patent
Latchman

(10) Patent No.: US 12,126,381 B2
(45) Date of Patent: Oct. 22, 2024

(54) OPTIMAL EQUALIZATION PARTITIONING

(71) Applicant: MACOM Technology Solutions Holdings, Inc., Lowell, MA (US)

(72) Inventor: Ryan Latchman, Irvine, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 69 days.

(21) Appl. No.: 17/894,966

(22) Filed: Aug. 24, 2022

(65) Prior Publication Data

US 2022/0407601 A1    Dec. 22, 2022

Related U.S. Application Data

(62) Division of application No. 17/144,428, filed on Jan. 8, 2021, now Pat. No. 11,438,064.

(Continued)

(51) Int. Cl.
*H04B 10/2543* (2013.01)
*H04B 10/077* (2013.01)
*H04B 10/2507* (2013.01)

(52) U.S. Cl.
CPC ..... *H04B 10/2543* (2013.01); *H04B 10/0775* (2013.01); *H04B 10/25073* (2013.01)

(58) Field of Classification Search
None
See application file for complete search history.

(56) References Cited

U.S. PATENT DOCUMENTS

| 4,534,064 A | 8/1985 | Giacometti et al. |
| 4,545,078 A | 10/1985 | Wiedeburg |

(Continued)

FOREIGN PATENT DOCUMENTS

| EP | 1471671 | 12/2004 |
| EP | 3500867 | 6/2019 |

(Continued)

OTHER PUBLICATIONS

French National Institute of Industrial Property ("INPI") Preliminary Report issued for Application No. FR191046 on Jun. 19, 2020.

(Continued)

*Primary Examiner* — Darren E Wolf
(74) *Attorney, Agent, or Firm* — Weide & Miller, Ltd.

(57) ABSTRACT

A communication interface comprising a host with non-linear equalizers configured to perform non-linear equalization. Also part of the interface is a host to optic module channel electrically connecting the host to an optic module and the optic module. The optic module comprises a transmitter and a receiver. The transmitter includes a linear equalizer and an electrical to optical module configured to convert the equalized signal from the driver to an optical signal, and transmit the optical signal over a fiber optic cable, such that the transmitter does not perform non-linear processing. The receiver includes a photodetector, configured to convert the received optic signal to a received electrical signal, and a linear amplifier configured to perform linear amplification on the received electrical signal. A driver sends the amplified received signal over an optic module to host channel, such that the receive does not perform non-linear processing.

18 Claims, 7 Drawing Sheets

Related U.S. Application Data

(60) Provisional application No. 63/076,863, filed on Sep. 10, 2020, provisional application No. 62/959,744, filed on Jan. 10, 2020.

(56) References Cited

U.S. PATENT DOCUMENTS

| | | |
|---|---|---|
| 4,687,924 A | 8/1987 | Galvin et al. |
| 4,734,914 A | 3/1988 | Yoshikawa |
| 4,747,091 A | 5/1988 | Doi |
| 4,849,998 A | 7/1989 | Poklemba |
| 4,864,649 A | 9/1989 | Tajima et al. |
| 5,019,769 A | 5/1991 | Levinson |
| 5,039,194 A | 8/1991 | Block et al. |
| 5,047,835 A | 9/1991 | Chang |
| 5,057,932 A | 9/1991 | Lang |
| 5,194,828 A | 3/1993 | Kato et al. |
| 5,210,712 A | 5/1993 | Saito |
| 5,289,302 A | 2/1994 | Eda |
| 5,293,405 A | 3/1994 | Gersbach et al. |
| 5,334,826 A | 8/1994 | Sato et al. |
| 5,383,046 A | 1/1995 | Tomofuji et al. |
| 5,383,208 A | 1/1995 | Queniat et al. |
| 5,392,273 A | 1/1995 | Masaki et al. |
| 5,394,416 A | 2/1995 | Ries |
| 5,396,059 A | 3/1995 | Yeates |
| 5,448,629 A | 9/1995 | Bosch et al. |
| 5,471,501 A | 11/1995 | Parr et al. |
| 5,488,627 A | 1/1996 | Hardin et al. |
| 5,510,924 A | 4/1996 | Terui et al. |
| 5,557,437 A | 9/1996 | Sakai et al. |
| 5,574,435 A | 11/1996 | Mochizuki et al. |
| 5,594,748 A | 1/1997 | Jabr |
| 5,636,254 A | 6/1997 | Hase et al. |
| 5,796,501 A | 8/1998 | Sotom et al. |
| 5,812,572 A | 9/1998 | King et al. |
| 5,822,099 A | 10/1998 | Takamatsu |
| 5,844,928 A | 12/1998 | Shastri et al. |
| 5,926,303 A | 7/1999 | Giebel et al. |
| 5,943,152 A | 8/1999 | Mizrahi et al. |
| 5,953,690 A | 9/1999 | Lemon et al. |
| 5,956,168 A | 9/1999 | Levinson et al. |
| 5,963,901 A | 10/1999 | Vahatalo et al. |
| 6,010,538 A | 1/2000 | Sun et al. |
| 6,014,241 A | 1/2000 | Winter et al. |
| 6,020,593 A | 2/2000 | Chow et al. |
| 6,021,947 A | 2/2000 | Swartz |
| 6,023,147 A | 2/2000 | Cargin, Jr. et al. |
| 6,049,413 A | 4/2000 | Taylor et al. |
| 6,064,501 A | 5/2000 | Roberts et al. |
| 6,108,113 A | 8/2000 | Fee |
| 6,111,687 A | 8/2000 | Tammela |
| 6,111,712 A | 8/2000 | Vishakhadatta et al. |
| 6,115,113 A | 9/2000 | Flockencier |
| H1881 H | 10/2000 | Davis et al. |
| 6,160,647 A | 12/2000 | Gilliland et al. |
| 6,175,434 B1 | 1/2001 | Feng |
| 6,259,293 B1 | 7/2001 | Hayase et al. |
| 6,282,017 B1 | 8/2001 | Kinoshita |
| 6,292,497 B1 | 9/2001 | Nakano |
| 6,317,062 B1 | 11/2001 | Payer et al. |
| 6,341,360 B1 | 1/2002 | Abdelilah et al. |
| 6,366,373 B1 | 4/2002 | MacKinnon et al. |
| 6,388,784 B1 | 5/2002 | Nakamura et al. |
| 6,438,450 B1 | 8/2002 | DiLorenzo |
| 6,445,662 B1 | 9/2002 | Tonami |
| 6,452,719 B2 | 9/2002 | Kinoshita |
| 6,494,370 B1 | 12/2002 | Sanchez |
| 6,556,601 B2 | 4/2003 | Nagata |
| 6,570,944 B2 | 5/2003 | Best et al. |
| 6,580,328 B2 | 6/2003 | Tan et al. |
| 6,661,940 B2 | 12/2003 | Kim |
| 6,707,492 B1 | 3/2004 | Itani |
| 6,707,600 B1 | 3/2004 | Dijaili et al. |
| 6,738,578 B1 | 5/2004 | Mihota |
| 6,740,864 B1 | 5/2004 | Dries |
| 6,801,555 B1 | 10/2004 | Dijaili et al. |
| 6,837,625 B2 | 1/2005 | Schott et al. |
| 6,852,966 B1 | 2/2005 | Douma et al. |
| 6,868,104 B2 | 3/2005 | Stewart et al. |
| 6,888,123 B2 | 5/2005 | Douma et al. |
| 6,909,731 B2 | 6/2005 | Lu |
| 6,934,307 B2 | 8/2005 | DeCusatis et al. |
| 6,934,479 B2 | 8/2005 | Sakamoto et al. |
| 6,941,077 B2 | 9/2005 | Aronson et al. |
| 6,952,531 B2 | 10/2005 | Aronson et al. |
| 6,956,643 B2 | 10/2005 | Farr et al. |
| 6,957,021 B2 | 10/2005 | Aronson et al. |
| 6,967,320 B2 | 11/2005 | Chieng et al. |
| 7,031,574 B2 | 4/2006 | Huang et al. |
| 7,039,082 B2 | 5/2006 | Stewart et al. |
| 7,046,721 B2 | 5/2006 | Grohn |
| 7,050,720 B2 | 5/2006 | Aronson et al. |
| 7,058,310 B2 | 6/2006 | Aronson et al. |
| 7,066,746 B1 | 6/2006 | Togami et al. |
| 7,079,775 B2 | 7/2006 | Aronson et al. |
| 7,184,671 B2 | 2/2007 | Wang |
| 7,215,891 B1 | 5/2007 | Chiang et al. |
| 7,227,916 B2 | 6/2007 | Ruelke et al. |
| 7,236,108 B2 | 6/2007 | Cheng |
| 7,265,334 B2 | 9/2007 | Draper et al. |
| 7,276,682 B2 | 10/2007 | Draper et al. |
| 7,381,935 B2 | 6/2008 | Sada et al. |
| 7,456,690 B2 | 11/2008 | Kocaman |
| 7,505,498 B2 | 3/2009 | Sanchez |
| 7,701,833 B2 | 4/2010 | Kim |
| 7,734,309 B2 | 6/2010 | Chi et al. |
| 7,949,025 B2 | 5/2011 | Olea |
| 7,978,012 B2 | 7/2011 | Wood |
| 8,213,494 B2 | 7/2012 | Hidaka |
| 8,396,110 B1 | 3/2013 | Hsieh |
| 8,861,578 B1 | 10/2014 | Lusted et al. |
| 8,948,614 B1 | 2/2015 | Schmidt |
| 8,995,514 B1 | 3/2015 | Asuncion et al. |
| 9,231,803 B2 | 1/2016 | Nishi |
| 9,397,868 B1 | 7/2016 | Hossain et al. |
| 9,559,880 B1 | 1/2017 | Cirit et al. |
| 9,853,735 B1 | 12/2017 | Lin |
| 9,853,839 B2 | 12/2017 | Beukema et al. |
| 9,882,703 B1 | 1/2018 | Xu |
| 9,906,232 B1 | 2/2018 | Cho |
| 10,333,692 B2 | 6/2019 | Miura |
| 10,404,496 B1 | 9/2019 | Azenkot |
| 2002/0012152 A1 | 1/2002 | Agazzi |
| 2002/0097467 A1 | 7/2002 | Terahara et al. |
| 2002/0105982 A1 | 8/2002 | Chin et al. |
| 2003/0165168 A1 | 9/2003 | Murata |
| 2004/0001538 A1 | 1/2004 | Garrett |
| 2004/0047635 A1 | 3/2004 | Aronson et al. |
| 2004/0136727 A1 | 7/2004 | Androni et al. |
| 2004/0188717 A1 | 9/2004 | Ono |
| 2004/0208526 A1 | 10/2004 | Mibu |
| 2005/0186918 A1 | 8/2005 | Ramet et al. |
| 2005/0215090 A1 | 9/2005 | Harwood |
| 2005/0226355 A1 | 10/2005 | Kibune et al. |
| 2006/0001494 A1 | 1/2006 | Garlepp et al. |
| 2006/0098699 A1 | 5/2006 | Sanchez |
| 2006/0126683 A1 | 6/2006 | Kang |
| 2006/0153256 A1 | 7/2006 | Sanchez |
| 2006/0165139 A1 | 7/2006 | Sanchez |
| 2007/0160173 A1 | 7/2007 | Takeuchi |
| 2007/0280388 A1 | 12/2007 | Torre |
| 2008/0111597 A1 | 8/2008 | Cranford et al. |
| 2008/0265998 A1 | 10/2008 | Wood |
| 2008/0290953 A1 | 11/2008 | Sandner et al. |
| 2008/0304559 A1 | 12/2008 | Wu |
| 2009/0141774 A1 | 6/2009 | Araki et al. |
| 2009/0244375 A1 | 10/2009 | Moehlmann et al. |
| 2010/0074615 A1 | 3/2010 | Kondo |
| 2011/0032013 A1 | 2/2011 | Nelson et al. |
| 2012/0002712 A1 | 1/2012 | Hayami |
| 2012/0038400 A1 | 2/2012 | Talaga, Jr. |
| 2013/0022309 A1 | 1/2013 | Yu |
| 2013/0287394 A1 | 10/2013 | Chaahoub |

(56) References Cited

U.S. PATENT DOCUMENTS

| | | |
|---|---|---|
| 2015/0180587 A1 | 6/2015 | Kalogerakis et al. |
| 2015/0180642 A1 | 6/2015 | Hsieh et al. |
| 2015/0381393 A1 | 12/2015 | Kotagiri |
| 2016/0006589 A1 | 1/2016 | Kamali |
| 2016/0197680 A1* | 7/2016 | Li .................... H04B 10/2543 398/194 |
| 2016/0352557 A1 | 12/2016 | Liao |
| 2016/0380785 A1 | 12/2016 | Chung |
| 2017/0070370 A1 | 3/2017 | He et al. |
| 2017/0288369 A1 | 10/2017 | Ikram et al. |
| 2017/0288779 A1* | 10/2017 | Tatum .............. H04B 10/25073 |
| 2018/0062747 A1 | 3/2018 | Gupta |
| 2018/0159514 A1 | 6/2018 | Zerbe et al. |
| 2018/0288779 A1 | 10/2018 | Dai |
| 2018/0294884 A1 | 10/2018 | Rope et al. |
| 2019/0207700 A1 | 7/2019 | Soto et al. |
| 2019/0243164 A1* | 8/2019 | Nelson ................. H03K 17/687 |
| 2020/0195475 A1 | 6/2020 | Lin |
| 2021/0242354 A1* | 8/2021 | Wang .................. H01L 31/1804 |

FOREIGN PATENT DOCUMENTS

| | | | | |
|---|---|---|---|---|
| JP | 58140175 | | 8/1983 | |
| JP | 62124576 | | 6/1987 | |
| JP | 62235975 | | 10/1987 | |
| JP | 62281485 | | 12/1987 | |
| JP | 2008206170 A | * | 9/2008 | ......... H04L 25/0307 |
| KR | 1020050085785 | | 8/2005 | |
| KR | 1020100061753 | | 6/2010 | |
| KR | 101684801 | | 12/2016 | |
| KR | 1020170148184 | | 12/2018 | |
| KR | 1020180049784 | | 5/2019 | |
| WO | WO 93/21706 | | 10/1993 | |
| WO | WO 02/063800 | | 8/2002 | |
| WO | WO 2004/098100 | | 11/2004 | |
| WO | WO 2008/070138 | | 6/2008 | |
| WO | WO 2018/080652 | | 5/2018 | |

OTHER PUBLICATIONS

International Search Report issued for PCT/US2020/055839 on Jan. 29, 2021.

International Search Report issued for PCT/US2020/050919 on Dec. 21, 2021.

International Search Report issued for Application No. PCT/US2020/051657 on Jan. 13, 2021.

Analog & Power, "An Introduction to clock distribution circuits", Alexander Pakosta, Texas Instruments, 2 pages, date unknown.

Texas Instruments, Application Report, "Using the CDCL6010 as a Frequency Synthesizer and Jitter Cleaner", Madhu Balasubramanian, SLLA259—Mar. 2007, Copyright © 2007, Texas Instruments Incorporated, 15 pages.

CDC7005, "3.3-V High Performance Clock Synthesizer and Jitter Cleaner", SCAS685J—Dec. 2002—Revised Jul. 2008, Copyright © 2008, Texas Instruments Incorporated, 33 pgs.

P.M Crespo Bofill, G. Shing Liu, C. Ho Wei, Combine Baud-rate timing recovery and adaptive equalization for high rate data transmission in digial subscriber lines. In Comunicaciones de Telefonica y Desarollo, vol. 41, No. 7, Jun. 1993. http://www.tid.es/presencia/publicationes/comsid/esp/articulos/vol41/combi/combi.html.

International Search Report issued for PCT/US2021/012636 on May 4, 2021.

* cited by examiner

| FIG. 4 |
|---|
| FIG. 4A | FIG. 4B |

OPTIMAL EQUALIZATION PARTITIONING

1. FIELD OF THE INVENTION

This invention relates to optical communication system and in particular to optimal equalization partitioning between a host and optical module.

2. RELATED ART

Current state of the art architectures for data center and client side connectivity at 26GBAUD and 53GBAUD (50 Gb/s, 100 Gb/s, 200G, 400 Gb/s, and future 800 Gb/s) are architected assuming time domain equalization functionality (FFE/DFE) and retiming in both ASICs found on host PCBs as well as optical modules which connect to the host via connector and/or PCB trace loss. While there is a benefit for time domain equalization and retiming to appear at every hop of the link, it comes at a cost from a silicon area and power consumption point of view.

50G (26GBAUD) and 100 Gb/s (53GBAUD) PAM electrical signaling used in communication systems is very challenging due to loss introduced by PCB and/or connectors, non-ideal characteristics seen in host ASICs, optical components non-idealities and reduced SNR (signal to noise ratio) due to multilevel signaling. Due to these losses, host (routers, switches, NICs) electrical outputs are evaluated with CTLE and/or FFE and/or DFE equalizers built into scopes and simulation tools to ensure the signal can be recovered within optical modules. In actual implementation, the electrical receiver in the module would include equalizers, such as CTLE and/or FFE and/or DFE equalizers. Prior art module implementations have these equalizers on their front end and retiming functionality to reset the signal integrity budget before communicating the bit stream to downstream optical components (laser driver and/or laser/transmit optical subassembly). This presents as clean as possible signal from the optical module for communication from 1 m–10 km+ but resetting the signal integrity through retiming comes at a cost from a power consumption and chip area perspective. At the same time, the optical interface is also evaluated with a 5-tap FFE reference receiver to establish the expected link performance that would occur in the receiver when installed in the field for data communication. The evaluation occurs for 50G SR/FR/LR, 200G SR/FR/LR, 100G FR/DR and 400G DR4/FR4/LR4 based on the TDECQ metric, with future link types also likely to leverage time domain equalization.

Evaluating the host with equalization, then resetting the signal integrity budget through retiming in the optical module, followed by evaluating the optical signal again with equalization represents a redundancy in equalization which increases costs, size and power consumption to the overall system which is not necessary if the signal is kept linear in the module (avoid retiming and non-linear equalization in the module). This also holds true in the receive path, where optical modules currently integrate various forms of equalization (emulating the TDECQ reference equalizer) along with retiming functionality which provides the cleanest possible electrical signal for communicating to hosts in the receive path. Hosts ASIC receivers also integrate extensive equalization to compensate for trace loss and/or copper cable losses. Having non-linear equalization as well as retiming in the optical module, and also in the host ASIC receive path again represents a redundancy in equalization/retiming which increases costs, size and power consumption to the overall system which is not necessary if the signal is kept linear in the module (avoid retiming and non-linear equalization in the module).

SUMMARY

To overcome the drawbacks in the prior art and provide additional benefits, disclosed is a modified optic module design which maintains a linear processing path/elements and eliminates duplication of elements in relation to downstream processing apparatus. For example, evaluating the host with equalization, then resetting the signal integrity budget through retiming in the optical module, followed by evaluating the optical signal again with equalization represents a redundancy in equalization which increases costs, size and power consumption to the overall system which is not necessary if the signal is kept linear in the module (avoid retiming and non-linear equalization in the module). This also holds true in the receive path, where optical modules currently integrate various forms of equalization (emulating the TDECQ reference equalizer) along with retiming functionality which provides the cleanest possible electrical signal for communicating to hosts in the receive path. Hosts ASIC receivers also integrate extensive equalization to compensate for trace loss and/or copper cable losses. Having non-linear equalization as well as retiming in the optical module, and also in the host ASIC receive path again represents a redundancy in equalization/retiming which increases costs, size and power consumption to the overall system which is not necessary if the signal is kept linear in the module (avoid retiming and non-linear equalization in the module).

In one embodiment, a transceiver having a transmit path and receive path is disclosed. The transceiver comprises a host having one or more non-linear equalizers configured to perform non-linear equalization on an outgoing signal, an incoming signal, or both. A host to optic module channel electrically connects the host to an optic module. The optic module comprises a transmitter and a receiver. The transmitter comprises a linear equalizer configured to perform linear equalization on the outgoing signal to create an equalized signal, a driver configured to receive and output the equalized signal, an electrical to optical module configured to convert the equalized signal from the driver to an optical signal, and transmit the optical signal over a fiber optic cable, such that the receive does not perform non-linear processing. The receiver comprises a photodetector configured to receive a received optic signal and convert the received optic signal to a received electrical signal, a linear amplifier configured to perform linear amplification on the received electrical signal to create amplified received signal, and a driver configured to send the amplified received signal over an optic module to host channel, such that the receive does not perform non-linear processing.

In one embodiment, the optic module includes a gain module configured to amplify the outgoing signal. The gain module may be part of the linear equalizer in the transmitter and the gain module is configured to perform linear amplification. It is contemplated that the optic module may not include a CDR configured to perform non-linear clock and data recovery. The optic module and host may also be configured to process received electrical signals and transmit electrical signal over an electrically conductive channel. It is further contemplated that the host may be configured to perform station to station training for link optimization due to the linear processing of the optic module. In one configuration the transceiver is part of an on-board optics configuration. The transceiver may be in an on-board optics configuration.

Also disclosed is a method for receiving and processing an optic signal to recover a transmitted signal. In one embodiment, this method includes receiving an optic signal at an optic module from a fiber optic cable such that the optic module is configured to only perform linear processing. Then converting the optic signal into an electrical signal and processing the electrical signal using linear processing before sending a processed electrical signal to a host. At the host, this method of operation performs non-linear processing on the processed electrical signal at the host to recover the transmitted signal.

It is contemplated that the optic module does not perform non-linear clock and data recovery. In addition, the non-linear processing by the host includes non-linear equalization. The optic module may be configured without an equalizer. This method may further comprise a method for transmitting an optic signal that comprises processing an outgoing electrical signal within the optic module using only linear processing.

Also disclosed is an optic module configured to receive and transmit optic signals. In one embodiment, the optic module includes a signal receive path configured to perform linear signal processing and a signal transmit path configured to perform linear processing on an outgoing signal. The signal receive path comprises a photodetector configured to receive a received optic signal and convert the received optic signal to a received electrical signal, a linear variable gain amplifier configured to amplify the received electrical signal to create an amplified signal, and an output port configured to provide the amplified signal to a host.

The signal transmit path is configured to perform linear processing on an outgoing signal. The signal transmit path comprises a linear equalizer configured to perform linear equalization on the outgoing signal received from the host to create an equalized signal, a driver configured to provide and drive an electrical to optical interface, and an electrical to optical interface configured to convert the equalized signal from the driver to an outgoing optic signal and transmit the outgoing optic signal on a fiber optic cable.

In one configuration, the signal transmit path further includes an amplifier. The system may further comprise a host with non-linear equalization is configured to perform equalization on the amplified signal and pre-compensation the outgoing signal. In one embodiment, the optic module does not include non-linear clock and data recovery. The optic module may be configured in an on-board optic configuration. The optic module may be configured in a co-packaged optic configuration.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 4, illustrate an optic signal transmit and receive system according to one embodiment of the innovation.

DETAILED DESCRIPTION

Figure 1:
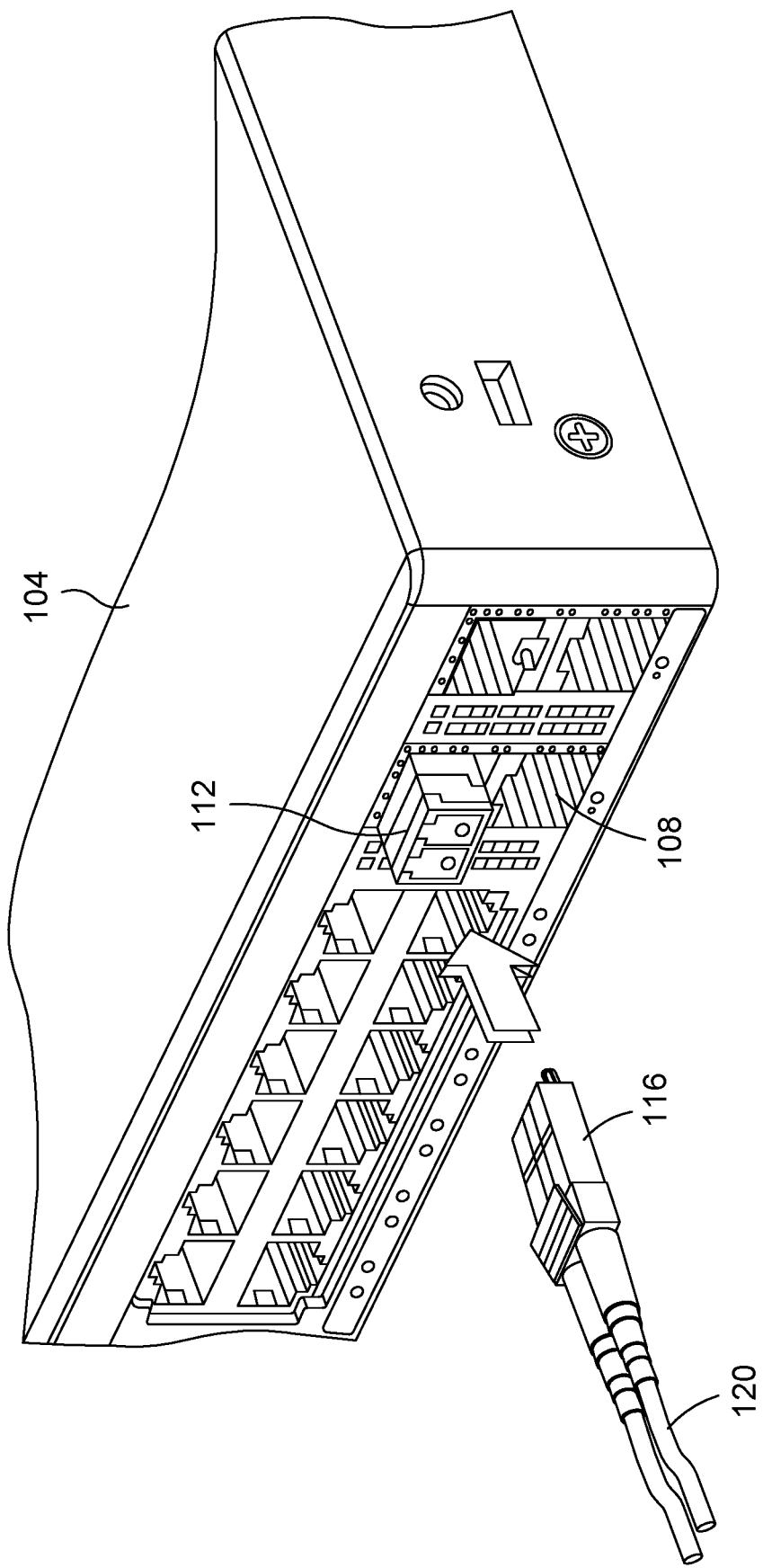
FIG. 1 illustrates an example environment of use of the innovation disclosed herein.

FIG. 1 illustrates an example environment of use of the innovations disclosed herein. As shown, a switch, router, computer, server or other electronic device, hereafter host 104 capable of data communication is provided with one or more ports 108 or slots. An optic module 112, is configured to slide into and electrically connect to the host 104 to effect data communication. Fiber optic cables 120, connect to the connector 116 to provide optical connectivity to the optic module 112 and host 104. In operation, a bi-directional optical link is used (transmit and receive). In the receive direction, the received optic signal from the fiber 120 is presented to the module 112 which in turn converts the optical signal to an electrical signal. The electrical signal is presented to the host 104. In the transmit direction, the transmitted electrical signal from the host 104 is presented to the module 112 which in turn converts the electrical signal to an optical signal for transmission over the connector 116 and fiber 120.

Figure 2:
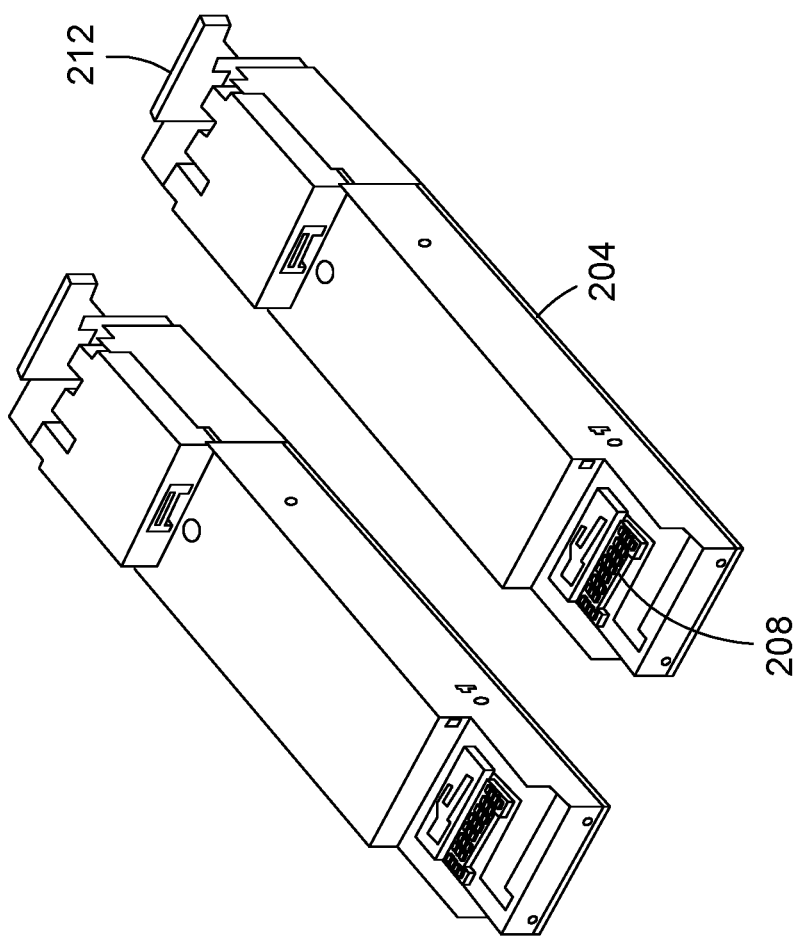
FIG. 2 is an exemplary optic module that slides into a data communication device (host).

FIG. 2 is an exemplary optic module 204 that slides into or otherwise connects to a data communication device, such as the host 104 shown in FIG. 1. The module 204 includes an electrical interface 208, that electrically connects a host, and an optic fiber interface 212 that optically connects to a fiber connector. The term module is defined herein to mean module and/or optical assembly.

Proposed is a linear interface for PAM (or any other signal type) optical modules in the transmit and/or receive direction for direct detect (non-coherent) applications with target reach less than 10 km primarily, but in other embodiments, applications of over 10 km are contemplated and feasible. The disclosed system is capable of operation over any distance and with any compatible technology and standard. These applications have the expected link margin and maintain the signaling supported by host ASICs (eg. switch ICs), thereby eliminating the need for additional non-linear equalization or retiming and minimizing the cost/power for next generation systems. As a result, it is proposed to remove the DSP (non-linear equalization and retiming) from the optic module to avoid duplication of hardware and processing operations and instead utilized on the non-linear processing in the host, such as the host ASIC. It is also proposed to maintain and use only linear processing the optic module. This applies to the transmit path and/or the receive path. As disclosed, in one embodiment, the architecture is kept linear throughout the optical module while non-linear processing is reserved for the host.

In the receive path, host ASICs includes complex equalization schemes providing advanced equalization capability to compensate for passive copper loss which can be much greater than optical channels. The host is configured to interface with an optic fiber or an electrical cable. For example, with the optical transmitter being configured with a 5-tap or greater FFE, there is adequate margin for signal recovery in the receive path for applications that have reaches less than 10 km by keeping the optical module receive path linear so that the downstream ASIC can leverage its equalizer to the fullest. Current architectures have the optical module performing equalization, then retiming the signal at a minimum, resetting the signal integrity budget at the expense of power and cost, and limiting the amount of recovery the ASIC can apply to just the local host trace.

Keeping the interface linear also enable end-to-end link optimization between ASICs using link training, which is broken when non-linear elements are in the path. End-to-end link optimization includes setting transmitters to optimal settings based on receiver metrics and presents another opportunity to further optimize the power consumed by the communication channel. The linear amplifier within optical modules can also be designed with optimal response taking into account the channel, dynamic range and reference receiver metrics (such as bandwidth of interest), such that it eliminates noise/ISI beyond the spectrum of interest. As discussed below, variable gain functionality, such as in the optic module, allows the system to maintain target optical operating point while maintaining the accuracy and effectiveness of the operation of and changes to the ASIC transmitter equalizer settings.

Figure 3:
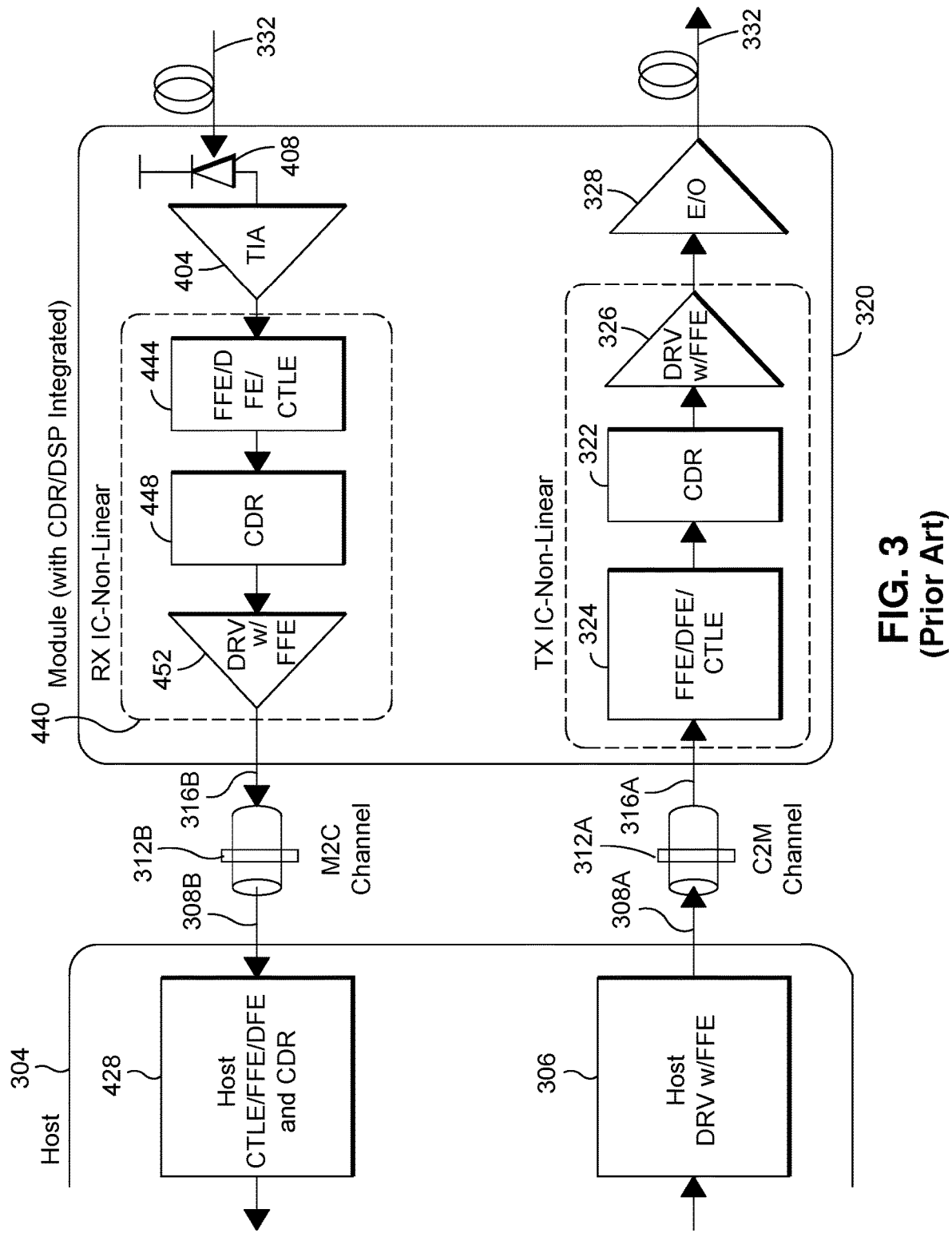
FIG. 3 illustrates a prior art optic signal transmit and receive system.

FIG. 3 illustrates a prior art optic signal transmit and receive system. As is understood in the art, the host and optic module typically include a transmit path with associated components and a receive path with associated components. As shown in FIG. 3, a host 304 provides an electrical signal to be transmitted to a host side electrical conductor(s) 308A that lead to a connector 312A. The connector 312A interfaces and connects the host 304 to the optic module 320. The connector 312A also electrically connects to an optic module electrical conductor(s) 316A. The optic module electrical conductor(s) 316A electrically connect and provide an electrical signal to an optic module component 320. Internal to the optic module component 320 is an equalizer system 324 that includes, in this embodiment, a feed forward equalizer (FFE) and a decision feedback equalizer (DFE) as well as a CTLE. It is understood that this functionality 324 is also located in the host equalizer 428. One or more of these elements perform non-linear processing on the signal.

The output of the optic module equalizer 324 connects to a CDR (clock and data recovery circuit) 322 and then to a laser driver 326, the output of which connects to an E/O (electrical to optical) converter such as a TOSA/Laser 328. The TOSA/Laser 328 converts the electrical signal to an optic signal. The CDR performs non-linear processing on the signal. The optic signal is output on an optic channel 332, such as fiber optic cable. During testing an exemplary scope-based transmitter evaluation system (not shown), which would emulate a reference receiver with equalization, was used to test and verify the transmit path met specification. In actual use, the opposing end of the optic cable 332 would connect to a remotely located receiver which would include an equalizer in the remote optic module and the remote host (not shown in FIG. 3). A reference equalizer (not shown) was used to evaluate the transmitters optical performance.

When discussing the receive path, shown at the top of FIG. 3, identical elements are labeled with identical reference numbers and are not described again. In this configuration of a receiver system, an optic signal is provided to the optic cable 332, and after passage through the fiber optic cable, is provided to a photo detector 408, which converts the optic signal to an electrical signal. The output of the photo detector 408 connects to a transimpedance amplifier (TIA) 404. As is understood in the art, the TIA 404 amplifies the electrical signal to a level suitable for subsequent processing. The output of the TIA 404 connects to a receiver integrated circuit (IC) 440. In this embodiment, the receiver IC comprises an equalization block 444 that includes one or more of the following: a FFE, a DFE, and CTLE, of which one or more perform non-linear processing on the signal. Thus, in the prior art, the equalization was non-linear thus making the equalization block 444 complex, expensive, large, and a significant power consuming element.

The output of the equalization block 444 feeds into a CDR (clock and data recovery) circuit 448 which is also non-linear, and the output of the CDR circuit 448 is provided to a driver with an optional FFE 453. The receiver IC 440 processes the received signal to recover the signal after the distorting effects of the channel.

The optic module 320 connects to the host 304 as discussed above through electrical channel elements 316B, 312B, 308B. The host 304 also includes the equalizer elements 428 as shown, which may include a CTLE, FFE, DFE and/or a CDR. One or more of the equalizer system components 440, 428 are non-linear due to the use of a slicer/retiming/clock and data recovery and the DFE in the host 304.

As can be appreciated, both the optic module 320 and the host 304 include equalizer systems, which is a duplication of functionality, and in turn increases costs, size, and power consumption, as well as creates an increase possibility for failure. For example, in the transmit path an equalizer functionality is found in the host DVR 306 as well as in the modules equalizer system 320. In the receive path, elements 440 and 428 are duplicative.

Figure 4A:
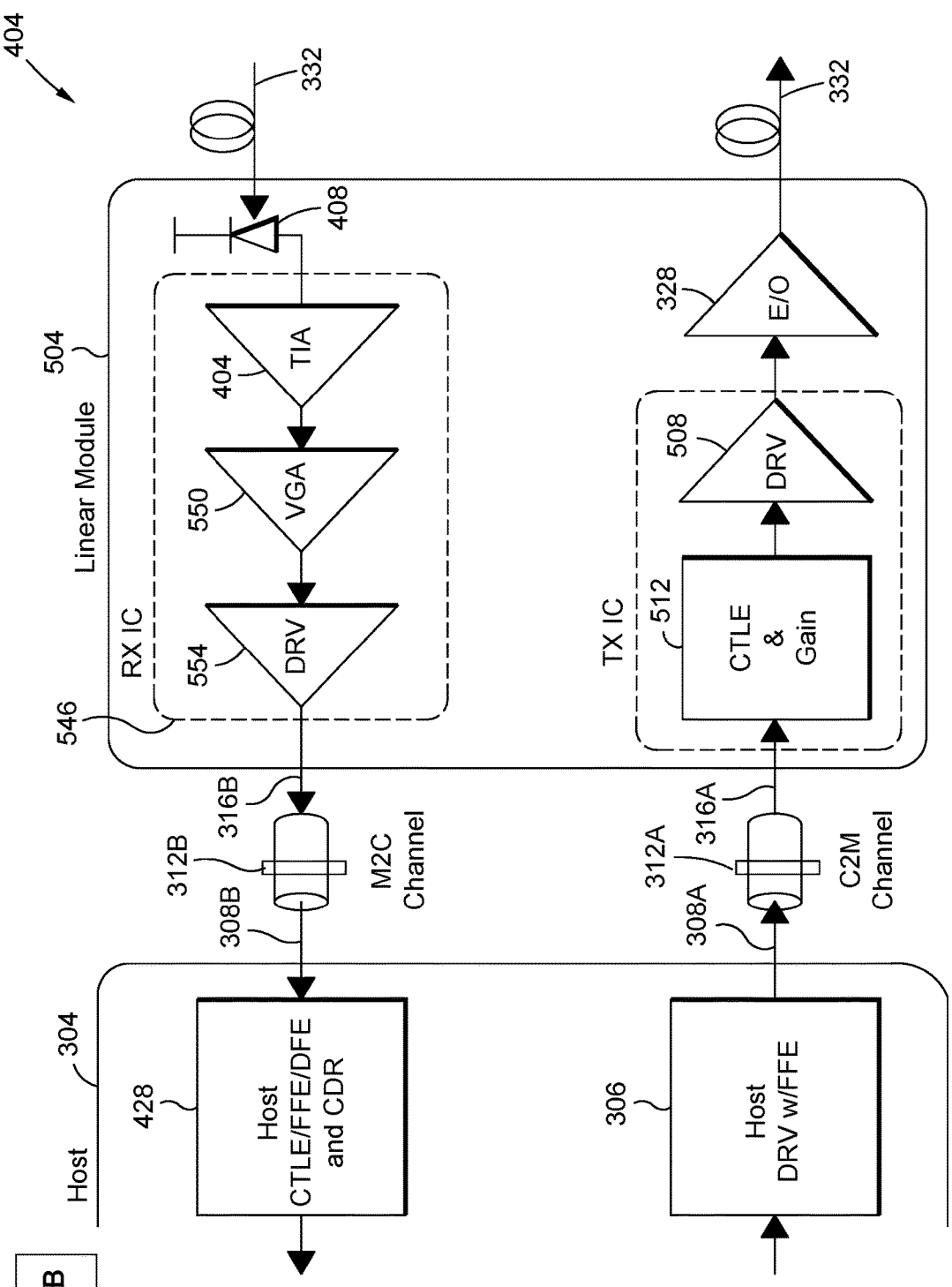
FIGS. 4A and 4B, collectively
Figure 4B:
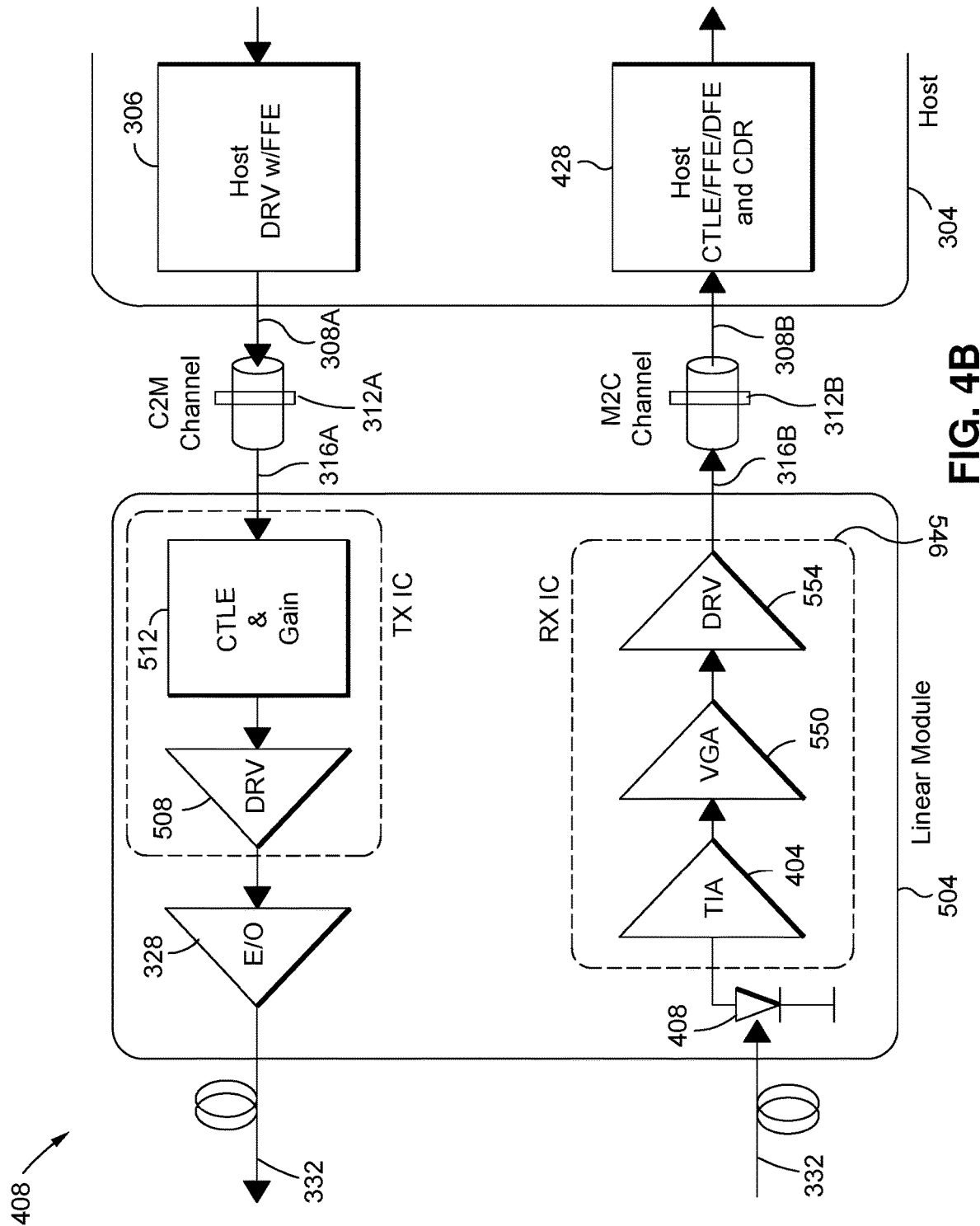

To overcome the drawbacks of the prior art and provide additional benefits, it is proposed to change the optic module from that shown in FIG. 3 to the embodiment of FIG. 4, which is a transmit and receive system according to one embodiment of the innovation. Comparing FIG. 4 to FIG. 3, identical elements are labeled with identical reference numbers and are not described again. In this embodiment, the optic module element 504 is configured with both transmit and receive path components. In FIG. 4, a first station 404 and second station 408 are shown to form a complete link path. Identical or similar elements at different stations 404, 408 are labeled with identical reference numbers. Thus, the TIA at the first station 404 is identified with an identical reference number as the TIA at the second station 408.

In the host is a driver with an FFE 306 which provides an electrical signal to the conductive path formed by elements 308A, 312A, 316A. The signal from the host 304 is provided in the transmit path to a linear CTLE unit 512 located in the optic module 504. The CTLE unit 512 is configured to perform continuous time linear equalization on the signal. A linear amplifier 508 receives the output of the CTLE 512 and performs linear amplification on the signal prior to conversion of the electrical signal to an optical signal by the TOSA/Laser 328. The resulting optic signal is provided on the optic channel 332 for transmission to a remote receiver. The optic channel 332 is referred to generally such that the transmit path and receive path may share and optic fiber or each path may have its own optic fiber. It is also contemplated that the driver (amplifier) 508 and equalizer 512 may be merged into a single element.

The linear amplifier 508, 512 may comprise any linear equalizer with any level of amplification, such as but not limited to a continuous time linear equalizer (CTLE), or any type of linear equalizer. The CLTE block may also include gain across all frequencies to increase the magnitude of the signal. The gain function may be part of the CTLE with gain block 512 or may be a separate element located either upstream or downstream of the CTLE. By removing the non-linear amplification/equalization/retiming/sampling from the optic module 504, the duplication between the optic module and the host 304 is reduced or eliminated. This saves space, reduces power consumption, and reduces costs. The equalization system 428 in the host 304 may be capable of processing the signal to remove or reverse the unwanted effects of the channel, thus making the duplication of equalizer components in the optic module 504 unnecessary. It should be noted that linear amplification is much less power demanding, less computationally complex, lower latency, less costly to implement, than non-linear equalization with retiming/sampling. Thus, system operation is achieved with fewer components, lower power consumption, lower cost, and reduced complexity as compared to the prior art. Note that the transmit path of the optic module does not include the non-linear CDR system and function.

Turning to the receive path in FIG. 4, shown by the upper path, an optic signal is received over an optic channel 332 and provided to a photodetector 408. The photodetector 408 converts the optic signal to an electrical signal. The resulting electrical signal is provided to the TIA 404 which amplifies and converts current output of the photodetector 408 to a voltage. The amplified voltage signal from the TIA 404 is provided to the variable gain amplifier (VGA) 550 which increases the voltage magnitude of the signal such that the amount of amplification is based on signal attenuation in the channel. The linear VGA amplifier 550 may comprise any linear amplifier or linear equalizer with any level of amplification, such as but not limited to a continuous time linear equalizer (CTLE), or any type of linear equalizer or linear amplifier. The output of the VGA 550 is provided to a driver 554 which sends the signal over the electrical conductors 308B, 312B, 316B as shown to the host equalizer 428. In this embodiment the host equalizer 428 includes one or more of the following: CTLE, FFE, DFE and CDR, at least one of which performs non-linear processing.

As discussed above, the processing within the receiver IC 546 is linear, thereby reducing complexity, cost, power, latency and space consumption. The non-linear equalization and sampling occur within the host 428 and the host is configured with processing elements 428 which are capable of recording the received signal without need for non-linear processing in the optic module 504. This arrangement provides the benefit discussed herein while still providing ample processing for signal recovery based on the minimal processing which occurs in the receiver IC 546 and the more complex non-linear equalization occurs in the host equalizer 428, which may include a CLTE, FFE, DFE and clock/data recovery functions.

The linear amplification functionality in both the transmit path and receive path ensures target optical operating point while maintaining the fidelity of the changes in ASIC transmitter equalizer settings used in transmitter training.

Based on testing and system analysis, the complex non-linear equalizer and sampling in the optic module can be removed without significantly impacting performance. Replacing the non-linear equalization and sampling is a linear amplifier. Simulations performed using an equalizer in the host set up for a copper channel and an input signal that is stressed per the standard of 3.4 dB impairment was conducted. An analysis on the resulting processed signal occurred to determine how much penalty or hit to sensitivity (margin) occurred. Overall, the COM test results were very good with a minimal change in expected sensitivity. Hence, testing revealed that there is enough margin remaining to accurately recover the signal even when the non-linear equalization is removed from the optic module. Thus, the DSP equalizer function in the optic module may be removed for a small but acceptable change in signal quality from the optical module, keeping in mind the signal quality is still recoverable using non-linear equalization in the host.

Figure 5:
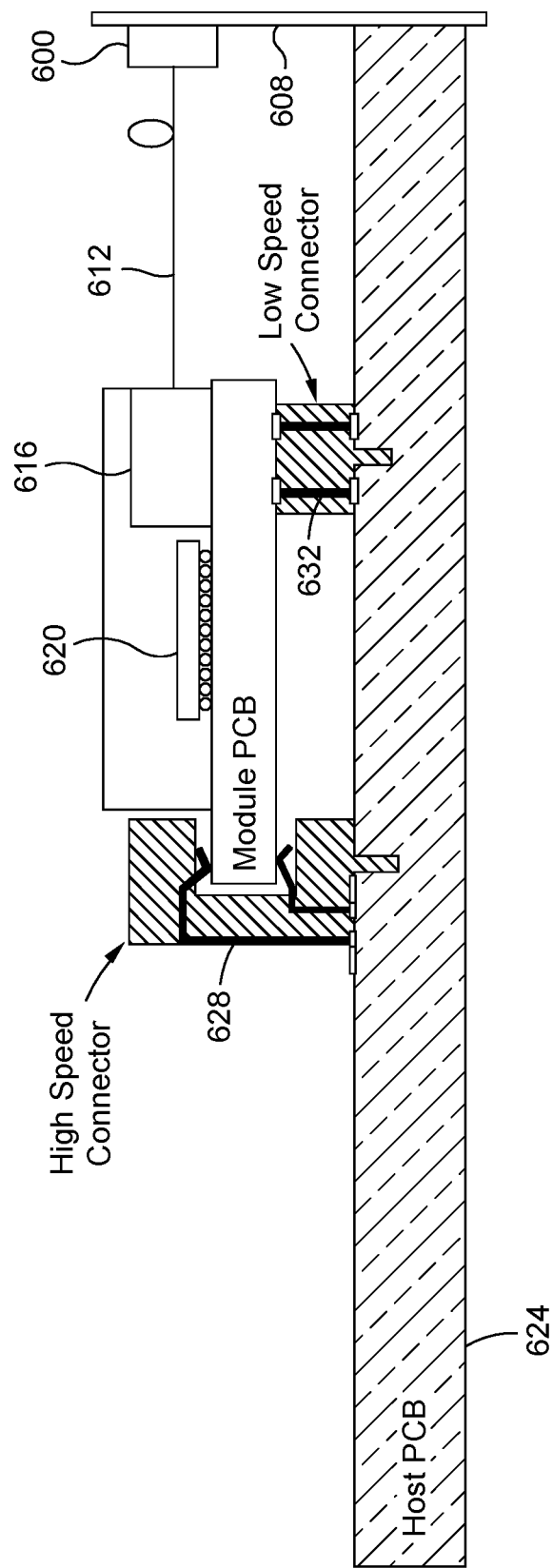
FIG. 5 illustrates an example embodiment of an on-board optics system, such as specified by the Consortium of Onboard Optics (COB 0).

FIG. 5 illustrates an example embodiment of an on-board optics system, such as specified by the Consortium of Onboard Optics (COBO). It is contemplated that any system or arrangement disclosed herein may be utilized in an onboard optic module environment. COBO has developed an industry standard for high-bandwidth on-board optics. COBO has recently published the OnBoard Optical Module Specification, which includes standards for 400 Gbps and 800 Gbps capacity. The OnBoard Optical Module Specification is incorporated by referenced herein in its entirety. In this embedment a port 604 is provided on a faceplate 608 of a host. A fiber optic cable 612 connects to an O/E module 616 which converts the optical signal to an electrical signal. The electrical signal is provided to an optic module IC 620. A high-speed connector 628 and a low speed connector 632 communication signals between the optic module IC 620 and the host PCB 624. A host IC (not shown) is electrically connected to the host PCB 624. In this embodiment, and the embodiments of FIGS. 7A-7C, the optic module 504 of FIG. 4 is represented by the optic module IC 620.

Figure 6A:
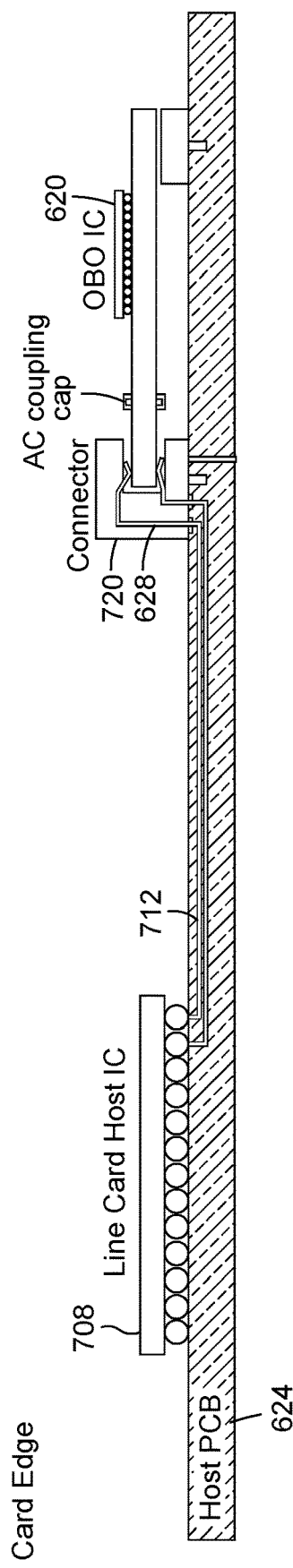
FIG. 6A, FIG. 6B, and FIG. 6C illustrate example configurations for host to optic module interfaces.
Figure 6B:
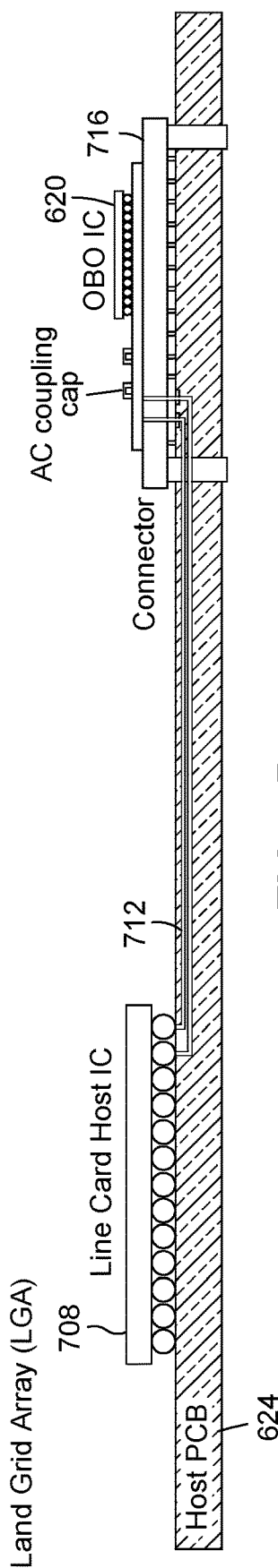
Figure 6C:
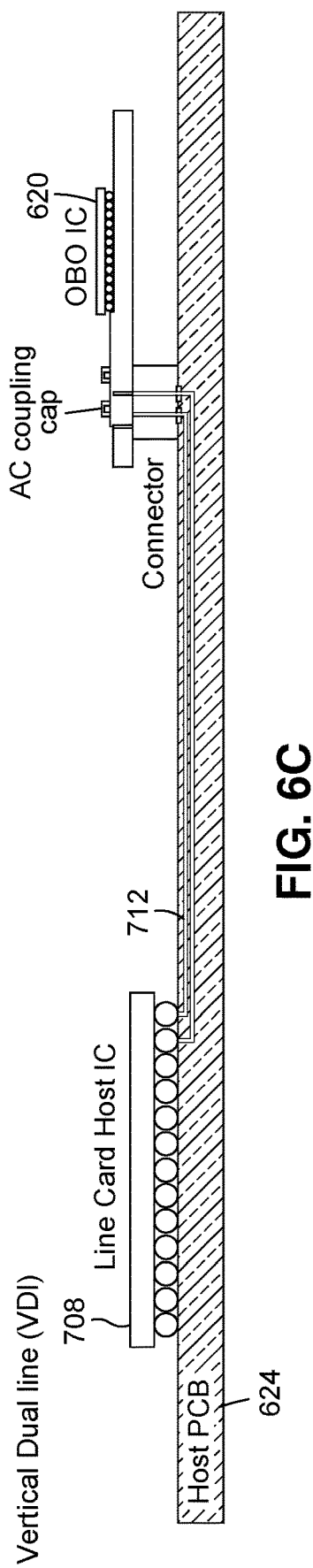

FIGS. 6A, 6B, and 6C illustrate example configurations for host to optic module interfaces. As compared to FIG. 5, similar or identical elements are labeled with identical reference numbers. In these various configurations, the host IC 708 perform the host processing, which may be non-linear equalization and other non-linear signal processing while the optic module IC 620 performs linear signal processing. Exemplary interconnects 712 within the host PCB 624 connect the host IC 708 to the optic module IC 620. Various OBO configurations are possible and shown. In FIG. 6A, the optic module IC 620 on the optic module PCB is inserted into a connector 720. This configuration may be referred to as a card edge configuration. In FIG. 6B, the optic module IC 620 mounts on a thin PCB which in turn connects to a socket 716. The socket 716 electrically connects to the host IC 708 through the host PCB traces 712. This configuration may be referred to as a land grid array configuration. In FIG. 6C, the optic module IC 620 and PCB are floating above the host PCB 624. This configuration may be referred to as a vertical dual line configuration.

With the ever-increasing speeds of networking technologies such as 400 Gigabit Ethernet, concerns have been raised about pluggable connector performance. Additionally, switch faceplates have a mechanical dimension limit for additional pluggable connectors. Both concerns are addressed under the COBO specification, which brings the connector on-board. Moving the optics away from the faceplate permits new and creative designs to support the higher thermal requirements of faster and larger radix switches. The COBO specification utilizes optical fiber as the recognized medium for high-speed, low-loss signal transmission and defines the characteristics of 8- and 16-lane On-Board Optics (OBOs) for use in up to 1×400 Gbps and 2×400 Gbps bandwidth capacity applications.

Also disclosed herein are one or more implementations for use with co-package optics and/or onboard optics embodiments. As discussed above, there are numerous benefits to co-packaged optics and/or onboard optics embodiments. The traditional optic module plugs into a host (element 104 in FIG. 1). A fiber optic cable plugs into optic port of the optic module. Internal to the optic module are processing elements, including a CDR which performs signal equalization and other elements which perform optic to electrical conversion.

To reduce the size, cost, and power consumption of the optic modules, co-package optics and/or onboard optics module (referred to herein after as a co-packaged optic modules) replace the optic modules of the prior art. As discussed below, the co-packaged optic module connects to fiber optic cables, which in this embodiment are ribbon cables terminated with an MPO connector. In this embodiment, the co-package optic module includes two or more lasers per module (often four lasers per module) and these lasers are shared across multiple fiber optic cables. The co-package optic module has the same number of channels and processing capability as four optic modules and has better future potential for further gains in processing power, space reduction, and reduced power consumption. The size of the co-packaged optic module is much small than the optic modules of the prior art. The innovation disclosed herein may be used with either pluggable optic modules, onboard optics, or co-packaged optics.

The innovation described herein may be used with a co-packaged optic module. In a co-packaged optic module system, a fiber optic cable carries an optic signal from a remote location to an optic module configured to convert the optical signal to an electrical signal. The photodetector in the optical module provides an electrical signal representing the optic signal to a TIA which is then communicated to the DSP to recover the signal prior to communicating over XSR channel to the host. In the transmit path, the DSP performs non-linear retiming prior to communicating the transmit data to the driver which then amplifies the electrical signal and provides the swing required for OE conversion. The PD, TIA driver and DSP form the co-packaged optic module. The DSP element process the electrical signal to compensate for unwanted effects of the XSR channel in the transmit path and optical receive data in the receive path. DSP may include equalization and other complex channel compensation processing including retiming/sampling. The output of the DSP element is routed through the XSR channel and into a switch die. The switch die performs switching and rerouting on all the incoming packets. Operation of the switch die is known by those of skill in the art and as such is not described in detail herein. The system may also include the package substrates, ball connectors, and a PCB substrate.

This prior art embodiment suffered from duplication of the DSP in each co-packaged optic module as well as in the switch die. Even if a DSP is not located in the switch die, the numerous optic modules with discrete DSP's establish a large number of expensive, space and power consuming DSP modules.

Also disclosed is a co-packaged optic module with an improved design that locates the DSP in the shared switch die and removes a DSP from each of the numerous co-packaged optic modules. In this embodiment, the package substrate is part of the optic module. In this embodiment, a DSP is located in the switch die and redundant sampling functionality is no longer provided in each of the numerous co-packaged optic modules. The processing capability of the switch die is shared between multiple co-packaged optic modules. By removing the DSP from the co-packaged optic module and establishing a DSP in the shared switch die, the number of sampling elements are greatly reduced. Further, the cost to integrate the DSP on the switch die is less than the cost to establish a similarly capable DSP in every optic module.

In this embodiment, the communication path from the TIA and driver element within the package substrate is a direct drive link, and thus a non-retimed C2M/XSR interface. The processing path from the optic module to the switch die up to the processing by the DSP may be made to have linear throughput in both directions. Thus, the electrical to optical and optical to electrical conversion is linear. Maintaining a linear interface provides the benefit that the non-linear CDR/sampling/equalization processing can occur in one place (within the switch die), which yields further cost, space, and power savings.

This innovation may be implemented with any type signal processing or encoding scheme, including PAM applications. PAM encoding includes higher order modulation and necessitates a more complicated and complex system to recover the signal. This in turn increases power consumption, heat generation, cost and size of the required CDR system (typically performed within the DSP) to support higher bit and baud rates. By moving the DSP to the ASIC (switching die) duplication of processing elements is reduced and implementation costs on the more capable ASIC are reduced as compared to an implementation that separately implements a DSP in each pluggable optic module. The cost of placing the DSP or other processing capability in the switch die (host) is less than if similar elements were configured as separate discrete dies as shown by DSP in the module. Using the proposed configured disclosed herein, the entire DSP die in the optic module is eliminated.

The benefits and advantages discussed above also apply the co-packaged optic embodiments or prior art pluggable modules. While the length of the channel or path between the TIA and driver element to the DSP die is potentially longer, thus suffering a small penalty in signal quality, the DSP located in the switch die is more than capable of performing the additional signal recovery tasks due to this this additional short signal path distance. Also disclosed is a direct driver embodiment and reduces optical module size and density, lowers complexity and cost was well as lowers system power.

The content of U.S. Provisional Patent Application 62/959,744 titled Optimal Equalization Partitioning filed on Jan. 10, 2020 is incorporated by reference herein for all purposes. The content of U.S. Provisional Patent Application 63/076,863 titled Optimal Equalization Partitioning filed on Sep. 10, 2020 is incorporated by reference herein for all purposes. Any incorporation by reference of documents above is limited such that no subject matter is incorporated that is contrary to the explicit disclosure herein. In the event of inconsistent usages between this document and those documents so incorporated by reference, the usage in the incorporated reference(s) should be considered supplementary to that of this document; for irreconcilable inconsistencies, the usage in this document controls.

Also disclosed is a host device configured with multiple co-packaged optic modules. As shown, one or more switch dies are located on a substrate. Two or more co-packaged optic modules are located on the package and communicate with the switch dies through the substrate such as through ball grid array (flip-chip) below the switch dies and the co-packaged optic modules. Fiber optic cables (ribbon cables) connect to each co-packaged optic module.

In this example embodiment, there are two switch dies shared between eight co-packaged optic modules. This reduces the number of non-linear sampling elements by half (DSP function removed from co-packaged optic module). This is a significant reduction in space, power consumption, complexity, heat generation, and cost. Based on testing, existing DSPs located in the switch dies have ample processing power and are capable of performing the processing on the signal from each co-packaged optic module.

As discussed above, co-packaged optic module and switch dies share the processing power of the switch die, which is located on a substrate. Multiple co-packaged optic modules are located on the substrates. In this embodiment, a one or more DSPs are on the switch die. By integrating the DSP function with the switch, co-packaged optical modules improve in density, and overall system power consumption is reduced by centralizing nonlinear sampling functionality.

There is also a benefit realized by placing the DSPs on the switch die because the size and geometry of the switch die (ASIC) is such that to add these DSPs adds very little cost and certainly much less costs than a separate DSP in each optic module. Thus, this embodiment removes the PHY from the optical module, and integrates the line side DSP into the switch. The switch die (ASIC) with the DSP therein is capable of driving the substrates interconnect to the TIA/Driver and has processing power to compensate for the entire signal path. Overall, this facilitates high density integration of photonics in optical module.

It is contemplated that operational speed (bit rate and baud) may be any currently existing speed or those speeds develop in the future. This may be 100 GB/S, 200 GB/S or any other bit rate or baud. In addition, any signaling, and coding scheme may be implemented with this innovation.

Other systems, methods, features and advantages of the invention will be or will become apparent to one with skill in the art upon examination of the following figures and detailed description including but not limited to optics on board applications. It is intended that all such additional systems, methods, features and advantages be included within this description, be within the scope of the invention, and be protected by the accompanying claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for receiving and processing an optic signal to recover a transmitted signal comprising:
   receiving the optic signal at an optic module from a fiber optic cable, the optic module configured to only perform linear processing;
   converting the optic signal into an electrical signal;
   processing the electrical signal to perform at least equalization on the electrical signal to create a processed electrical signal, wherein the equalization comprises only linear equalization, before sending the processed electrical signal to a host;
   receiving the processed electrical signal at the host; and
   performing non-linear processing, including non-linear equalization, on the processed electrical signal at the host to recover the transmitted signal.

2. The method of claim 1 wherein the optic module does not perform non-linear clock and data recovery.

3. The method of claim 1 further comprising processing an outgoing electrical signal within the optic module using only linear processing to generate the optical signal and transmitting the optic signal over an optic cable.

4. A method for processing an optic signal to recover a signal received from a remote transmitter, the method comprising:
   receiving the optic signal at an optic module;
   converting the optic signal to an electrical signal with a photodetector to create an electrical signal;
   performing linear amplification, linear equalization, or both of the electrical signal with a linear amplifier, linear equalizer, or both to create an amplified signal;
   driving the amplified signal over an optic module-to-host channel, such that neither the electrical signal nor the amplified signal undergo non-linear processing prior to driving of the amplified signal over the optic module-to-host channel;
   receiving the amplified signal at a host; and
   at the host, performing non-linear processing, including equalization, on the amplified signal or a host processed version of the amplified signal.

5. The method of claim 4 wherein the performing linear amplification occurs with a variable gain amplifier.

6. The method of claim 4 wherein performing linear equalization in the optic module is performed by a continuous time linear equalizer (CTLE).

7. The method of claim 4 where the linear amplification automatically adjusts to maintain a target optical operating point while also maintaining host transmitter settings established during station-to-station training.

8. The method of claim 4 wherein the optic module does not perform non-linear clock and data recovery and the transceiver operates at 25 Gb/s or more.

9. The method of claim 4 wherein non-linear processing by the host includes non-linear equalization.

10. The method of claim 4 further comprising, at the host, performing station to station training for link optimization due to the linear processing of the optic module.

11. The method of claim 4 wherein the host is part of an on-board optics configuration.

12. The method of claim 4 further comprising processing an outgoing electrical signal within the optic module using only linear processing to generate an optical signal and transmitting the optic signal over an optic cable.

13. A method for receiving and transmitting optic signals comprising:
   receiving and processing a signal through a receiver path, in an optic module, the receiver path comprising a photodetector and a linear variable gain amplifier that is configured to perform linear signal processing, the receiving and processing comprising:
      receiving an optic signal;
      converting the received optic signal to a received electrical signal with the photodetector;
      amplifying the received electrical signal with the linear variable gain amplifier to create an amplified signal;
      outputting the amplified signal via an output port to a host;
   processing and transmitting an outgoing signal through a transmit path, in the optic module, the transmit path comprising a linear equalizer and an electrical to optical interface that are configured to perform linear signal processing, comprising:
      providing the outgoing signal from the host to the optic module;
      in the optic module, performing linear equalization on the outgoing signal with the linear equalizer to create an equalized signal;
      presenting the equalized signal to the electrical to optical interface;
      converting the equalized signal, with the electrical to optical interface, to an outgoing optic signal; and transmitting the outgoing optic signal onto a fiber optic cable.

14. The method of claim 13 wherein processing and transmitting further comprises amplifying the outgoing signal prior to transmitting.

15. The method of claim 13 further comprising performing non-linear equalization in the host on the outgoing signal prior to providing the outgoing signal to the optic module.

16. The method of claim 13 wherein the optic module does not perform non-linear clock and data recovery.

17. The method of claim 13 wherein the method is performed by a transceiver configured in a on-board optic configuration.

18. The method of claim 13 wherein the optic module is configured in a co-packaged optic configuration.

* * * * *